(12) United States Patent
Müller

(10) Patent No.: US 12,381,757 B2
(45) Date of Patent: Aug. 5, 2025

(54) MODULAR SWITCH FOR USE IN A DATA TRANSMISSION AND CONTROL SYSTEM

(71) Applicant: Phoenix Contact GmbH & Co. KG, Blomberg (DE)

(72) Inventor: Martin Müller, Lügde (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 17/605,401

(22) PCT Filed: Apr. 22, 2020

(86) PCT No.: PCT/EP2020/061230
§ 371 (c)(1),
(2) Date: Oct. 21, 2021

(87) PCT Pub. No.: WO2020/216796
PCT Pub. Date: Oct. 29, 2020

(65) Prior Publication Data
US 2022/0209987 A1    Jun. 30, 2022

(30) Foreign Application Priority Data
Apr. 24, 2019   (BE) .................................. 2019/5271

(51) Int. Cl.
*H04L 12/413*    (2006.01)
*H04L 12/40*    (2006.01)

(52) U.S. Cl.
CPC ...... *H04L 12/413* (2013.01); *H04L 12/40032* (2013.01)

(58) Field of Classification Search
CPC .................... H04L 12/413; H04L 12/40032
See application file for complete search history.

(56) References Cited

U.S. PATENT DOCUMENTS

| 4,658,333 | A | 4/1987 | Grimes |
| 5,128,855 | A | 7/1992 | Hilber et al. |

(Continued)

FOREIGN PATENT DOCUMENTS

| CN | 1216475 C | 8/2005 |
| CN | 2805235 Y | 8/2006 |

(Continued)

OTHER PUBLICATIONS

English translation of the International Preliminary Report on Patentability issued in PCT application No. PCT/EP2020/061230, Sep. 28, 2021, 7 pp.

(Continued)

*Primary Examiner* — Hoang-Chuong Q Vu
(74) *Attorney, Agent, or Firm* — Kaplan Breyer Schwarz, LLP

(57) ABSTRACT

A modular switch for use in a data transmission and control system, includes:
a first module, which has a first bus segment supporting Ethernet-based communication and at least one first interface, to which a two-, or four- or eight-wire cable for transmitting Ethernet data packets can preferably be connected, and a second module, which has a second bus segment supporting Ethernet-based communication and a plurality of second interfaces, to each of which an external Ethernet-capable I/O device having a 2-wire interface can be connected via a 2-wire line for transmitting Ethernet data packets. The first module and the second module are each arranged in a separate housing and each has an interface for electrically coupling the first and second bus segments.

9 Claims, 1 Drawing Sheet

(56) References Cited

U.S. PATENT DOCUMENTS

| | | | |
|---|---|---|---|
| 5,615,079 A | 3/1997 | Eggert | |
| 5,651,003 A * | 7/1997 | Pearce | H04L 12/433 370/406 |
| 5,896,508 A | 4/1999 | Lee | |
| 6,033,268 A | 3/2000 | Piper et al. | |
| 6,241,561 B1 | 6/2001 | Zebermann et al. | |
| 6,640,308 B1 | 10/2003 | Keyghobad et al. | |
| 6,690,668 B1 | 2/2004 | Szczepanek et al. | |
| 6,728,239 B1 | 4/2004 | Kung et al. | |
| 6,947,410 B1 | 9/2005 | Schwartz et al. | |
| 7,286,552 B1 | 10/2007 | Gupta et al. | |
| 7,359,371 B2 | 4/2008 | Emley et al. | |
| 7,408,876 B1 | 8/2008 | Gupta et al. | |
| 7,599,292 B1 | 10/2009 | Gupta et al. | |
| 7,719,992 B1 * | 5/2010 | Gourlay | H04L 43/0817 370/254 |
| 8,204,070 B1 | 6/2012 | Ghaibeh | |
| 8,654,680 B2 | 2/2014 | Subramanian et al. | |
| 8,711,681 B2 | 4/2014 | Hu et al. | |
| 8,758,061 B2 | 6/2014 | Mische et al. | |
| 8,799,551 B2 | 8/2014 | Ham | |
| 8,867,552 B2 * | 10/2014 | Vobbilisetty | H04L 49/357 370/219 |
| 8,958,414 B1 * | 2/2015 | Wong | H04L 12/403 709/224 |
| 9,225,556 B2 | 12/2015 | Chini et al. | |
| 10,186,821 B2 | 1/2019 | Müller et al. | |
| 10,313,103 B1 * | 6/2019 | Perras | H04B 10/516 |
| 2002/0065935 A1 | 5/2002 | Koperda et al. | |
| 2003/0021080 A1 | 1/2003 | Koperda et al. | |
| 2003/0174719 A1 * | 9/2003 | Sampath | H04L 49/352 370/402 |
| 2004/0033720 A1 | 2/2004 | Bergner et al. | |
| 2004/0085894 A1 | 5/2004 | Wang et al. | |
| 2004/0105425 A1 | 6/2004 | Chen et al. | |
| 2004/0131073 A1 * | 7/2004 | Hahn | H04L 49/102 370/422 |
| 2004/0158667 A1 | 8/2004 | Carr | |
| 2004/0240180 A1 * | 12/2004 | Crippen | H01L 23/3672 257/E23.099 |
| 2005/0044137 A1 | 2/2005 | Dubreuil | |
| 2005/0078706 A1 | 4/2005 | Spencer | |
| 2005/0135387 A1 | 6/2005 | Rychener et al. | |
| 2005/0228889 A1 | 10/2005 | Cohen et al. | |
| 2006/0146823 A1 * | 7/2006 | Ding | H04L 45/16 370/390 |
| 2007/0060362 A1 * | 3/2007 | Osgood | G07F 17/3223 463/42 |
| 2008/0123635 A1 * | 5/2008 | Mortensen | H04Q 3/68 370/360 |
| 2008/0205418 A1 * | 8/2008 | Rose | H04L 45/00 370/401 |
| 2011/0243152 A1 * | 10/2011 | Goncalves | H04L 12/2898 370/463 |
| 2011/0292206 A1 * | 12/2011 | Newton | H04L 12/4641 348/143 |
| 2012/0026648 A1 | 2/2012 | Schneider et al. | |
| 2012/0290759 A1 | 11/2012 | Blair et al. | |
| 2012/0294156 A1 | 11/2012 | Hack et al. | |
| 2013/0045613 A1 | 2/2013 | Griese et al. | |
| 2013/0100884 A1 | 4/2013 | King et al. | |
| 2013/0301495 A1 | 11/2013 | Miller | |
| 2014/0098820 A1 * | 4/2014 | Anantharam | H04L 49/254 370/400 |
| 2015/0023368 A1 * | 1/2015 | Connolly | H04L 12/6402 370/420 |
| 2015/0043576 A1 | 2/2015 | Dixon et al. | |
| 2015/0120001 A1 | 4/2015 | German et al. | |
| 2015/0121507 A1 | 4/2015 | Haija et al. | |
| 2015/0188798 A1 * | 7/2015 | Mizrahi | H04L 45/245 370/252 |
| 2015/0263762 A1 | 9/2015 | Shen et al. | |
| 2015/0333637 A1 | 11/2015 | Izumi | |
| 2016/0037240 A1 * | 2/2016 | Yang | H04Q 11/0062 398/45 |
| 2016/0173021 A1 | 6/2016 | Lelkes | |
| 2016/0173371 A1 | 6/2016 | Bays | |
| 2016/0191418 A1 | 6/2016 | Kong | |
| 2017/0070365 A1 | 3/2017 | Varmani | |
| 2017/0244635 A1 | 8/2017 | Felemban et al. | |
| 2018/0059629 A1 | 3/2018 | Haridas et al. | |
| 2018/0069359 A1 | 3/2018 | Müller et al. | |
| 2018/0139062 A1 | 5/2018 | Alley et al. | |
| 2018/0150061 A1 | 5/2018 | Yang et al. | |
| 2018/0281598 A1 | 10/2018 | Shu | |
| 2018/0364671 A1 | 12/2018 | Van et al. | |
| 2019/0238349 A1 | 8/2019 | Moffitt et al. | |
| 2019/0319394 A1 | 10/2019 | Trenkamp et al. | |
| 2020/0078070 A1 * | 3/2020 | Henderson | H04L 63/0227 |
| 2020/0078118 A1 * | 3/2020 | Henderson | H04M 1/72406 |
| 2020/0127869 A1 | 4/2020 | Spanjers | |
| 2020/0153174 A1 | 5/2020 | Curtis et al. | |
| 2020/0195450 A1 | 6/2020 | Bains et al. | |
| 2020/0221544 A1 * | 7/2020 | Nishizaki | H04L 63/0861 |
| 2020/0235780 A1 | 7/2020 | Bains et al. | |
| 2020/0394146 A1 | 12/2020 | McLaughlin et al. | |
| 2020/0408565 A1 * | 12/2020 | Lee | G01R 22/063 |
| 2021/0144877 A1 | 5/2021 | Lessmann | |
| 2021/0235594 A1 | 7/2021 | Teeter et al. | |
| 2022/0046114 A1 | 2/2022 | Entelis et al. | |

FOREIGN PATENT DOCUMENTS

| | | |
|---|---|---|
| CN | 102099783 A | 6/2011 |
| CN | 102833112 A | 12/2012 |
| CN | 103164380 A | 6/2013 |
| CN | 104243297 A | 12/2014 |
| CN | 204578558 U | 8/2015 |
| CN | 204721371 U | 10/2015 |
| CN | 105099820 A | 11/2015 |
| CN | 105703690 A | 6/2016 |
| CN | 206364825 U | 7/2017 |
| CN | 207601619 U | 7/2018 |
| CN | 207926649 U | 9/2018 |
| DE | 3688778 T2 | 3/1994 |
| DE | 4421267 A1 | 1/1996 |
| DE | 4438804 C1 | 3/1996 |
| DE | 19600644 C1 | 4/1997 |
| DE | 19651961 A1 | 6/1998 |
| DE | 19706636 A1 | 8/1998 |
| DE | 29706564 U1 | 8/1998 |
| DE | 29901194 U1 | 5/1999 |
| DE | 19807710 A1 | 9/1999 |
| DE | 19902745 A1 | 8/2000 |
| DE | 20015758 U1 | 1/2002 |
| DE | 10148470 A1 | 4/2003 |
| DE | 10204694 A1 | 7/2003 |
| DE | 10216115 A1 | 10/2003 |
| DE | 10316649 A1 | 11/2003 |
| DE | 20217772 U1 | 3/2004 |
| DE | 10245643 A1 | 4/2004 |
| DE | 10254285 A1 | 6/2004 |
| DE | 10360190 A1 | 7/2004 |
| DE | 102004056363 A1 | 6/2006 |
| DE | 102005010820 A1 | 9/2006 |
| DE | 60123984 T2 | 6/2007 |
| DE | 102007009552 A1 | 8/2008 |
| DE | 60133747 T2 | 7/2009 |
| DE | 102009001177 A1 | 9/2010 |
| DE | 102009003846 A1 | 11/2010 |
| DE | 202011000834 U1 | 11/2011 |
| DE | 202011000835 U1 | 11/2011 |
| DE | 202011105337 U1 | 11/2011 |
| DE | 102011051154 A1 | 2/2012 |
| DE | 102011006590 A1 | 5/2012 |
| DE | 102013003971 A1 | 9/2014 |
| DE | 102013206723 A1 | 10/2014 |
| DE | 102015200568 A1 | 7/2015 |
| DE | 102014004241 A1 | 10/2015 |
| DE | 102014110017 A1 | 1/2016 |
| DE | 102014111030 A1 | 2/2016 |
| DE | 102014115678 A1 | 4/2016 |

(56) References Cited

FOREIGN PATENT DOCUMENTS

| | | |
|---|---|---|
| DE | 102015223315 A1 | 5/2016 |
| DE | 102014119065 A1 | 6/2016 |
| DE | 102014119101 A1 | 6/2016 |
| DE | 102016110641 B3 | 11/2017 |
| DE | 102016215742 A1 | 3/2018 |
| DE | 102016223024 A1 | 5/2018 |
| DE | 102016124637 A1 | 6/2018 |
| DE | 102017212256 A1 | 1/2019 |
| DE | 102017212487 A1 | 1/2019 |
| EP | 0345493 A1 | 12/1989 |
| EP | 0364618 A1 | 4/1990 |
| EP | 0710064 A1 | 5/1996 |
| EP | 0776077 A2 | 5/1997 |
| EP | 1126665 A2 | 8/2001 |
| EP | 1203303 A1 | 5/2002 |
| EP | 1282287 A2 | 2/2003 |
| EP | 1547314 A1 | 6/2005 |
| EP | 1576765 A1 | 9/2005 |
| EP | 1800450 A1 | 6/2007 |
| EP | 1884148 A2 | 2/2008 |
| EP | 1983812 A1 | 10/2008 |
| EP | 2002348 A2 | 12/2008 |
| EP | 2161638 A1 | 3/2010 |
| EP | 2187571 A1 | 5/2010 |
| EP | 2211523 A1 | 7/2010 |
| EP | 2241980 A1 | 10/2010 |
| EP | 2282321 A1 | 2/2011 |
| EP | 2405612 A1 | 1/2012 |
| EP | 2421100 A1 | 2/2012 |
| EP | 2448182 A1 | 5/2012 |
| EP | 2456133 A1 | 5/2012 |
| EP | 2631810 A1 | 8/2013 |
| EP | 2648284 A1 | 10/2013 |
| EP | 2698677 A1 | 2/2014 |
| EP | 2765465 A1 | 8/2014 |
| EP | 2913727 A1 | 9/2015 |
| EP | 3032732 A2 | 6/2016 |
| EP | 3040794 A1 | 7/2016 |
| EP | 3090511 A1 | 11/2016 |
| EP | 3179689 A1 | 6/2017 |
| EP | 3192704 A1 | 7/2017 |
| EP | 3256983 A1 | 12/2017 |
| EP | 3324579 A1 | 5/2018 |
| EP | 3373527 A1 | 9/2018 |
| GB | 2404815 A | 2/2005 |
| JP | 03-016383 U | 2/1991 |
| JP | 2004-227570 | 8/2004 |
| JP | 2006-314098 | 11/2006 |
| JP | 2008-078906 | 4/2008 |
| JP | 2008-547294 | 12/2008 |
| JP | 2009-211838 A | 9/2009 |
| JP | 2011-049659 A | 3/2011 |
| JP | 2011-185612 A | 9/2011 |
| JP | 5040246 B2 | 10/2012 |
| JP | 2015-530046 | 10/2015 |
| JP | 2016-081391 | 5/2016 |
| JP | 2018-073418 | 5/2018 |
| JP | 2018-514904 | 6/2018 |
| KR | 10-0404092 B1 | 11/2003 |
| WO | 94/27196 A1 | 11/1994 |
| WO | 97/41650 A1 | 11/1997 |
| WO | 99/23737 A1 | 5/1999 |
| WO | 00/64099 A2 | 10/2000 |
| WO | 01/09739 A1 | 2/2001 |
| WO | 02/27465 A1 | 4/2002 |
| WO | 2003/107594 A1 | 12/2003 |
| WO | 2004/054174 A1 | 6/2004 |
| WO | 2006/039941 A1 | 4/2006 |
| WO | 2006/124515 A2 | 11/2006 |
| WO | 2007/121022 A2 | 10/2007 |
| WO | 2008/097992 A1 | 8/2008 |
| WO | 2012/000807 A1 | 1/2012 |
| WO | 2012/000808 A1 | 1/2012 |
| WO | 2015/103469 A1 | 7/2015 |
| WO | 2015/198087 A1 | 12/2015 |
| WO | 2016/094825 A1 | 6/2016 |
| WO | 2016/128668 A1 | 8/2016 |
| WO | 2016/151019 A1 | 9/2016 |
| WO | 2017/037381 A1 | 3/2017 |
| WO | 2018/049314 A1 | 3/2018 |
| WO | 2018/068040 A1 | 4/2018 |
| WO | 2018/104929 A1 | 6/2018 |
| WO | 2019/043446 A1 | 3/2019 |

OTHER PUBLICATIONS

Office Action issued in Chinese patent application No. 2020800306862, Aug. 26, 2022, 14 pp. w/ translation.
International Search Report issued in PCT application No. PCT/EP2020/078742, Jan. 13, 2021, 2 pp.
Office Action issued in German patent application No. 102019127551.2, Aug. 25, 2020, 17 pp. w/ translation.
"Ethernet over twisted pair", Wikipedia, the free encyclopaedia, 4 pp., https://en.wikipedia.org/wiki/OI-Link, Feb. 13, 2019.
"IO-Link", Wikipedia, the free encyclopaedia, 7 pp. w/ translation, https://en.wikipedia.org/wiki/OI-Link, Feb. 13, 2019.
International Search Report issued in counterpart PCT application No. PCT/EP2020/061230, Jul. 2, 2020, 3 pp.
Office Action issued in counterpart German patent application No. 102019110592.7, Feb. 13, 2020, 15 pp. w/ translation.
Search Report issued in counterpart Belgian patent application No. BE2019/5271, Oct. 16, 2019, 10 pp.
ABB Research Ltd, English Translation of Indian patent application No. 932/CHE/2008 filed on Apr. 16, 2008 entitled "An Intelligent Electronic Device for Substation or Distribution Automation Systems" (published application was not available), Jul. 2, 2010, 7 pp.
English Translation of the International Preliminary Report on Patentability issued in PCT application No. PCT/EP2020/078742, Apr. 19, 2022, 10 pp.
Office Action issued Nov. 30, 2022 in Japanese Patent Application No. 2021-560962 and English Translation thereof.
International Search Report issued in PCT application No. PCT/EP2021/057014, Jun. 17, 2021, 3 pp.
English Translation of International Preliminary Report on Patentability issued on Sep. 22, 2022 in PCT Patent Application No. PCT/EP2021/057014.
Office Action issued in German patent application No. 102019127195.9, Jun. 3, 2020, 26 pp.
Office Action issued in Chinese patent application No. 202011072393.9, Dec. 2, 2021, 21 pp. w/ translation.
Office Action issued in Chinese patent application No. 202011072393.9, Jun. 29, 2022, 19 pp. w/ translation.
Inventor: Martin Müller, Multifunctional Network Switch for Use in a Process-Controlling Automation System . . . , Apr. 12, 2022, Unpublished Related U.S. Appl. No. 17/768,342.
Inventor: Martin Müller et al., Unpublished U.S. Appl. No. 17/914,679 entitled :Backplane Module for Electrically Connecting a Plurality of Functional Modules . . . :, Sep. 26, 2022.
Wikipedia, "Ethernet over twisted pair", Mar. 25, 2019, 4 pp.
Wikipedia, IO-Link definition, Feb. 5, 2019, 7 pp., https://de.wikipedia.org/w/index.php?title=IO-Link&oldid=185391430 English Translation: https://en.wikipedia.org/wiki/IO-Link.
Office Action issued in Japanese Patent Application No. 2021-560962 on Apr. 12, 2023 and English Translation thereof.
Office Action issued in Chinese patent application No. 202080072299.5, Apr. 29, 2023, 18 pp. w/ translation.
Non-Final Rejection Mailed on Aug. 23, 2023 for U.S. Appl. No. 17/066,388, 6 page(s).
Notice of Allowance and Fees Due (PTOL-85) Mailed on Feb. 7, 2024 for U.S. Appl. No. 17/066,388, 8 page(s).
Non-Final Rejection Mailed on Mar. 27, 2024 for U.S. Appl. No. 17/768,342, 11 page(s).
Office Action issued in Japanese Patent Application No. 2022-554821 on Apr. 10, 2024 and English Translation thereof.
List of references Mailed on Jul. 17, 2024 for U.S. Appl. No. 17/914,679, 1 page(s).
Notice of Allowance and Fees Due (PTOL-85) Mailed on Jul. 17, 2024 for U.S. Appl. No. 17/914,679, 8 page(s).

(56) References Cited

OTHER PUBLICATIONS

Notice of Allowance and Fees Due (PTOL-85) Mailed on Jul. 29, 2024 for U.S. Appl. No. 17/066,388, 10 page(s).
"International Search Report and Written Opinion" issued in counterpart PCT application No. PCT/EP2016/056385, dated Jul. 5, 2016.
Matthias Mueller, "Office Action" issued in counterpart German patent application No. 102015104290.8, dated Jan. 18, 2016.
Notice of Allowance and Fees Due (PTOL-85) received for U.S. Appl. No. 15/560,016, mailed on Nov. 15, 2018, 2 pages.
Notice of Allowance received for U.S. Appl. No. 15/560,016, mailed on Oct. 1, 2018, 2 pages.
Notice of Allowance received for U.S. Appl. No. 15/560,016, mailed on Sep. 12, 2018, 5 pages.
Office Action issued in Japanese Patent Application No. 2022-521077 on Nov. 22, 2023 and English Translation thereof.
Office Action issued on Nov. 22, 2023 in Japanese Patent Application No. 2022-554821 and English Translation thereof.
Office Action issued in Japanese patent application No. 2017-549774, Sep. 28, 2018, 9 pp.
1 Final Rejection Mailed on Oct. 29, 2024 for U.S. Appl. No. 17/768,342, 12 page(s).
Notice of Allowance and Fees Due (PTOL-85) Mailed on May 13, 2024 for U.S. Appl. No. 17/066,388, 8 page(s).
EP Office Action Mailed on Jun. 1, 2023 for EP Application No. 20719213, 4 page(s).
Non-Final Rejection Mailed on Feb. 27, 2025 for U.S. Appl. No. 17/768,342, 13 page(s).

* cited by examiner

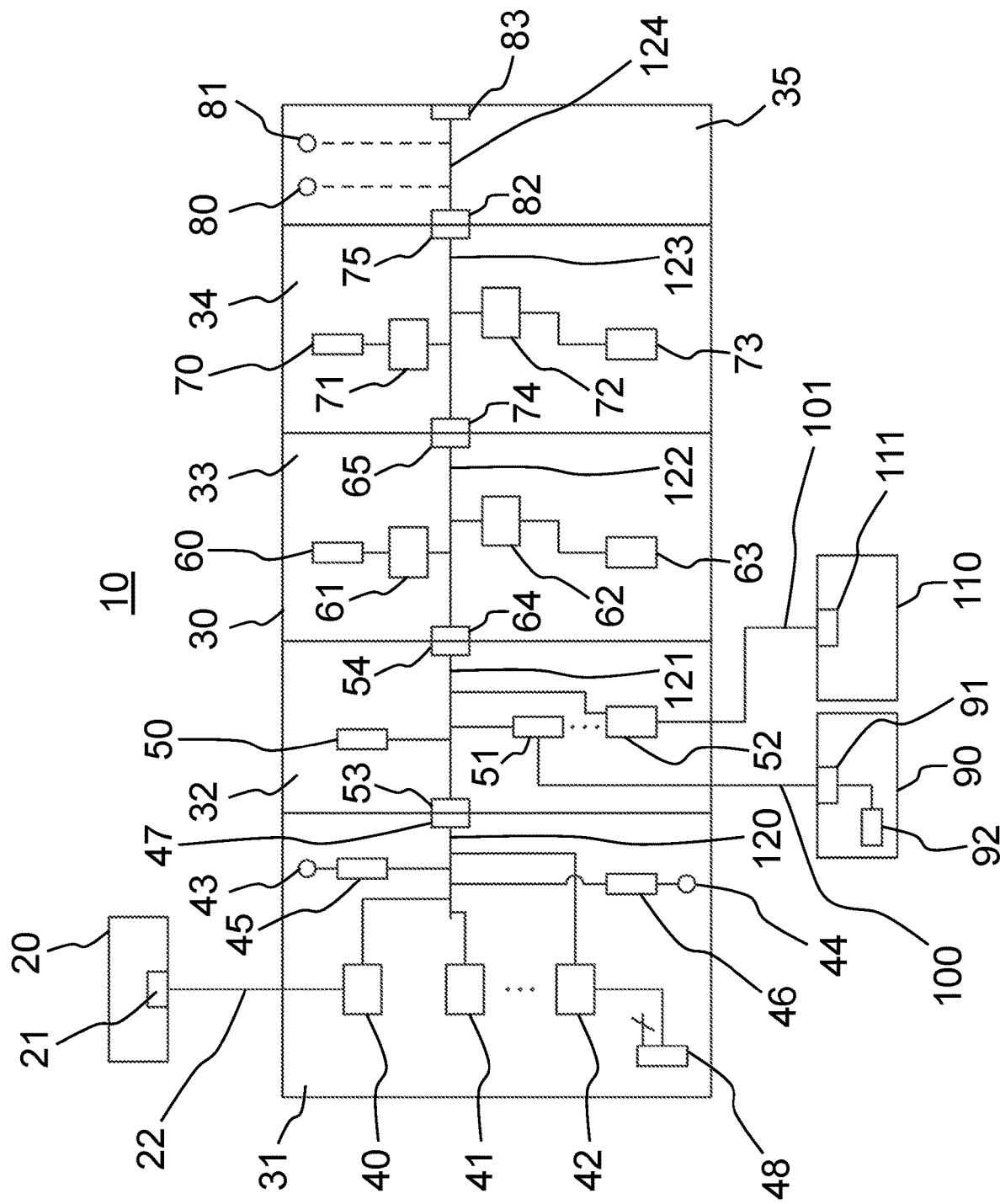

MODULAR SWITCH FOR USE IN A DATA TRANSMISSION AND CONTROL SYSTEM

FIELD

The invention relates to a modular switch, which can be used in particular in a data transmission and control system, such as an automation system, as well as to a data transmission and control system comprising such a modular switch.

BACKGROUND

In general, an automation system is characterized by the fact that several sensors and actuators can exchange data with a higher-level control device via a transmission medium. In order to structure and simplify the installation of an automation system, so-called I/O modules can be provided, which are connected to the higher-level control system via the transmission medium, wherein several sensors and actuators can be connected to each I/O module.

SUMMARY

The object of the invention is to provide a modular switch for use in a data transmission and control system, which enables easy scaling of the data transmission and control system as well as flexible adaptation of a data transmission and control system to different transmission media and different communication protocols.

A core idea of the invention can be seen in creating a switch that can be flexibly assembled from modules, in which the internal communication, i.e. the communication between the modules and in particular between the interfaces or connection ports of the modules and preferably to an external control device connected to the modular switch is carried out according to the Ethernet communication protocol, while the communication between the interfaces of the modules and the electronic or electrical devices connected to these interfaces can be carried out via different transmission media.

The above technical problem is solved, firstly, by the features of claim 1.

Accordingly, a modular switch is provided for use in a data transmission and control system, wherein the modular switch comprises the following features:

A first module comprising a first bus segment supporting Ethernet-based communication and at least one first interface for transmitting and receiving Ethernet data packets, wherein the at least one first interface is electrically connected to the first bus segment, a second module comprising a second bus segment supporting Ethernet-based communication and multiple second interfaces, to each of which an external Ethernet-capable device with a 2-wire interface can be connected via a 2-wire line for transmitting Ethernet data packets. In this way, Ethernet communication can be enabled between the second bus segment and the respective external Ethernet-capable device. The second interfaces are electrically connected to the second bus segment, with the first module and the second module each being arranged in a separate housing and each having an interface for electrically coupling the first and second bus segments. The second interfaces of the second module and the 2-wire interface of the Ethernet-capable device can each be, for example, a single-pair Ethernet interface, while the 2-wire line can be a single-pair Ethernet line.

It should be noted that the data transmission and control system may be, for example, an industrial automation system or a building automation system, and the external Ethernet-capable device may be an Ethernet-capable I/O device, such as a sensor or actuator.

The first module may have at least one optical interface for connecting an optical waveguide, the optical interface being connected to the first bus segment via an electro-optical converter, and/or the at least one first interface may be designed for connecting a two-wire, or four-wire, or eight-wire cable.

According to an advantageous embodiment, the modular switch can be extended by a third module, which has a multiple third interfaces and a third bus segment supporting Ethernet-based communication, the third interfaces each being designed as IO-Link interfaces for connecting an external IO-Link device and each being connected to the third bus segment via a gateway, wherein the third module is arranged in a separate housing and comprises at least one interface for electrically coupling the third bus segment to the first or second bus segment.

According to an advantageous embodiment, the modular switch can optionally or additionally be extended by a fourth module comprising multiple fourth interfaces and a fourth bus segment supporting an Ethernet-based communication, wherein the fourth interfaces are each designed as wireless interfaces for connecting an external wireless device and are each connected to the fourth bus segment via a gateway, wherein the fourth module is arranged in a separate housing and comprises at least one interface for electrically coupling the fourth bus segment to one of the bus segments.

To enable a compact design, the housings of the modules can be designed to be lined up in a side-by-side arrangement directly next to each other. The module housings can, for example, comprise mechanical latching elements that facilitate mechanical interconnection of the modules.

According to an advantageous embodiment, the housings of the modules can have latching elements by means of which the housings can be latched onto a mounting rail.

According to an advantageous embodiment, the modular switch comprises an internal control unit that is adapted to control the transmission of Ethernet data packets via the bus segments to or from the interfaces. Preferably, the internal control unit is implemented in the first module. It is conceivable that the internal control unit is also implemented in a separate module, or one of the second to fourth modules of the modular switch.

According to a practical embodiment, the first module can have several optical interfaces for respectively connecting an optical waveguide, wherein the optical interfaces each are connected to the first bus segment via an electro-optical converter. It is conceivable that additionally or optionally optical interfaces for respectively connecting an optical waveguide may be implemented in the second, and/or third, and/or fourth, and/or in a further module, each optical interface then being connected to the corresponding bus segment via an electro-optical converter, i.e. a media converter.

The above technical problem is solved, secondly, by the features of claim 9.

Accordingly, a data transmission and control system is provided comprising at least one modular switch according to any of the preceding claims 1 to 8. Furthermore, the data transmission and control system comprises a control device connected to one of the first interfaces of the first module via a two-wire, or four-wire or eight-wire cable, and at least one Ethernet-capable device, in particular an Ethernet-capable I/O device, having a 2-wire interface, which is connected to one of the second interfaces of the second module of the modular switch via a 2-wire cable for transmitting Ethernet data packets.

BRIEF DESCRIPTION OF THE DRAWING

The invention is described in more detail below by means of an examplary embodiment in conjunction with the accompanying drawing, in which FIG. 1 illustrates an exemplary data transmission and control system 10.

DETAILED DESCRIPTION

FIG. 1 illustrates an exemplary data transmission and control system 10, which may be, for example, an industrial automation system. The exemplary automation system 10 comprises, for example, a higher-level Ethernet-capable control device 20, which may be a programmable logic controller (PLC). Further, the exemplary automation system 10 may comprise at least one modular switch 30. By the term "Ethernet-capable", it is preferably understood that a device is configured for communication in accordance with the standard Ethernet communication protocol.

The modular switch 30 comprises a first module 31, which has a first bus segment 120 and at least one first Ethernet-based interface, but preferably a plurality of first Ethernet-based interfaces 40 to 42, to each of which a two-wire, or four-wire, or eight-wire cable 22 can be connected for connecting an external electronic device. The first interfaces 40 to 42 are electrically connected to the first bus segment 120. Ethernet data packets can preferably be transmitted via the first bus segment 120 and the two-, or four-, or eight-wire cables in accordance with the standard Ethernet communication protocol. The three first interfaces 40 to 42 may be RJ45 jacks, for example. The control device 20 has an Ethernet-based interface 21. Thus, the control device 20 can be electrically connected to the first interface 40 of the first module 31 for sending and receiving Ethernet data packets, for example, via the two- or four- or eight-wire cable 22.

In the embodiment shown, the first module 31 may also comprises optical interfaces 43 and 44 for connecting a respective optical waveguide. The two optical interfaces 43 and 44 are each connected to the first bus segment 120 via a respective one of electro-optical converters 45 and 46. Herein, the electro-optical converters act as media converters.

The modular switch 30 comprises a second module 32 having a second bus segment 121 and a plurality of second interfaces 50 to 52, to each of which an external Ethernet-capable device, in particular an Ethernet-capable I/O device, having a 2-wire interface can be connected via a 2-wire line. The second interfaces 50 to 52 are each connected to the second bus segment 121 and can perform the function of a two-wire converter to convert the Ethernet data packets received over a 2-wire line for transmission over a four- or eight-wire line and vice versa.

Shown are two external Ethernet-capable I/O devices 90, 110, each having a 2-wire interface 91 and 111, respectively. The 2-wire interfaces 91 and 111 may be RJ45 jacks, wherein interface 91 may be connected to I/O device 90 via a 2-wire line 100 and interface 111 may be connected to I/O device 110 via a 2-wire line 101. The Ethernet-enabled I/O device 90 may be a temperature sensor, while the Ethernet-enabled I/O device 110 may be an actuator, for example.

Ethernet data packets can be transmitted via the second bus segment 121 and the 2-wire lines 100 and 101. The second interfaces 50 to 52 of the second module 32 and the 2-wire interfaces 91 and 111 of the Ethernet-capable devices 90 and 110, respectively, may each be a single-pair Ethernet interface, for example, while the 2-wire lines 100 and 101 may each be single-pair Ethernet lines.

The first module 31 and the second module 32 are each arranged in a separate housing and each have an interface 47 and 53, respectively, for electrically coupling the first bus segment to the second bus segment. The interface 47 terminates the first bus segment 120, while the interface 53 terminates the second bus segment 121. Interfaces 47 and 53 are arranged on opposite sides of the housing in such a way that the housings of modules 31 and 32 can be lined up directly next to each other in a side-by-side arrangement, and the two bus segments 120 and 121 are electrically connected to each other when assembled. The second bus segment 121 is connected at its second end to a further interface 54, which is arranged on the opposite side of the housing and is designed for electrical coupling to a bus segment of a further module.

The modular switch 10 may be expanded to include a third module 33, which may be connected to the second module 32, for example, but may also be connected to the first module 31. The third module 33 has a plurality of third interfaces 60, 63 and a third bus segment 122, over which Ethernet data packets can preferably be transmitted in accordance with the standard Ethernet communication protocol. The third interfaces 60, 63 are each designed as IO-Link interfaces, to each of which an external IO-Link device can be connected. The IO-Link devices may be intelligent sensors or actuators that can communicate with the higher-level control device 20. The IO-Link interface 60 is electrically connected to the third bus segment via a gateway 61, while the other IO-Link interface 63 is electrically connected to the third bus segment 122 via a gateway 62. It is also conceivable that the IO-Link interface 60 and the gateway 61 or the IO-Link interface 63 and the gateway 62 each form a single assembly. It is understood that the third module 33 may also have more than two IO-Link interfaces. In particular, the gateways 61 and 62 function as protocol converters that convert the IO-Link communication protocol to the Ethernet communication protocol and vice versa so that IO-Link devices can exchange data with the higher-level Ethernet-capable control device 20 via the modular switch 30.

The third module 33 is in turn arranged in a separate housing and has an interface 64 terminating the third bus segment 122 for electrical coupling, for example, with the second bus segment 121 of the second module 32. The interfaces 64 and 54 are arranged on opposite sides of the housing in such a way that the housings of the modules 32 and 33 can be lined up directly next to one another in a side-by-side arrangement, and the two bus segments 121 and 122 are electrically connected to one another in the assembled state. The third bus segment 122 is connected at its second end to a further interface 65, which is arranged on the opposite side of the housing and is designed for electrical coupling to a bus segment of a further module.

In the illustrated embodiment, the modular switch 30 can be expanded to include a fourth module 34 that can be connected to the third module 33, for example. The fourth module 34 comprises a plurality of fourth interfaces 70, 73 and a fourth bus segment 123. The fourth interfaces 70, 73 may be wireless interfaces, to each of which an external wireless device may be connected. The wireless interfaces 70 and 73 may be electrically connected to the fourth bus segment 123 via a gateway 71 and a gateway 72, respectively. It is also conceivable that the wireless interface 70 and the gateway 71 or the wireless interface 73 and the gateway 72 each form a single assembly. It is understood that the fourth module 34 may also have more than two wireless interfaces. In particular, the gateways 71 and 72 again function as protocol converters that convert a wireless or radio communication protocol to the Ethernet communication protocol and vice versa, so that wireless devices can exchange data with the higher-level Ethernet-capable control device 20 via the modular switch 30.

The fourth module 34 is in turn arranged in a separate housing and has an interface 74 terminating the fourth bus segment 123 for electrical coupling, for example, with the third bus segment 122 of the third module 33. The interfaces 74 and 65 are arranged on opposite sides of the housing in such a way that the housings of the modules 33 and 34 can be lined up directly next to one another in a side-by-side arrangement and the two bus segments 122 and 123 are electrically connected to one another in the assembled state. The fourth bus segment 123 is connected at its second end to a further interface 75, which is arranged on the opposite side of the housing and is designed for electrical coupling to a bus segment of a further module.

In order to be able to supply the modules 31 to 34 and their electrical and/or electronic components with power, a further module 35 may be provided, which can be coupled to the module 34, for example. In addition to a further bus segment 124, the module 35 has two connections to which, for example, an external 24V DC voltage source can be connected. An efficient implementation envisages that the bus segments 120 to 124 can also be used to transmit the supply voltage to the respective modules. In this case, the two terminals 80 and 81 are electrically connected to the bus segment 124. The bus segment 124 can be connected at both ends to an interface 83 and 82 respectively in order to be able to be electrically connected to the bus segment of an adjacent module.

The housings of the modules 31 to 35 can have latching elements so that housings of the modules can also be mechanically coupled to each other. In the assembled state of the modules 31 to 35, the bus segments 120 to 124 form a bus for the transmission of Ethernet data packets and, if necessary, for power transmission.

Practically, the housings of the modules 31 to 35 can have latching means for latching onto a mounting rail (not shown). In this case, the bus segments 120 to 124 extend parallel to the longitudinal axis of the mounting rail.

In order to be able to exchange data between the higher-level control device 20 and the I/O devices connected to the first interfaces 40 to 42, and/or the optical interfaces 43 and 44, and/or the second interfaces 50 to 52, and/or the third interfaces 60, 63 and/or the fourth interfaces 70, 73, an in-switch control unit 48 is provided, which is designed to control the forwarding of the Ethernet data packets transmitted via the bus segments 120 to 123 to the corresponding interfaces or to the corresponding gateways. Preferably, the internal control unit 48 is arranged in the first module 31.

Thus, the data transmission and control system 10 exemplary shown in FIG. 1 comprises, for example, the modular switch 30, the Ethernet-capable control device 20 connected to the interface 40 of the modular switch 20 via the four-wire or eight-wire cable 22, and the two Ethernet-capable I/O devices 90 and 110 connected to the interfaces 51 and 52 of the second module 32 via the respective 2-wire lines 100 and 101.

As already mentioned, the Ethernet-capable I/O device 90 may be a temperature sensor which, under the control of a control unit 92, which may be designed as a microcontroller, for example, packs digital measured values into Ethernet data packets and transmits them to the higher-level control device 20 via the 2-wire Ethernet interface 91, the 2-wire line 100, the second interface 51 and the two bus segments 121 and 120, and via the first interface 40.

Thanks to the module-based switch 30, the data transmission and control system 10 exhibits a high degree of flexibility in terms of applicable transmission media and applicable communication protocols, as well as a high degree of scalability. Moreover, thanks to the modular switch 30, the data transmission and control system 10, and thus in particular industrial automation systems, can be installed without the use of I/O modules to which the I/O field devices are usually connected.

| Reference numeral | Description |
| --- | --- |
| 10 | data transmission and control system |
| 20 | control device |
| 21 | Ethernet-based interface |
| 22 | cable |
| 30 | modular switch |
| 31 | first module |
| 32 | second module |
| 33 | third module |
| 34 | fourth module |
| 35 | further module |
| 40, 41, 42 | first interface |
| 43, 44 | optical interface |
| 45, 46 | electro-optical converter |
| 47, 53, 54, 64, 65, 74, 75, 82, 83 | interface |
| 48 | internal control unit |
| 50, 51, 52 | second interface |
| 60, 63 | third interface |
| 61, 62, 71, 72 | gateway |
| 70, 73 | fourth interface |
| 80, 81 | terminal |
| 90 | I/O device |
| 91, 111 | 2-wire interface |
| 92 | control unit |
| 100, 101 | 2-wire line |
| 110 | I/O device |
| 120 | first bus segment |
| 121 | second bus segment |
| 122 | third bus segment |
| 123 | fourth bus segment |

The invention claimed is:

1. A modular switch for use in a data transmission and control system, the modular switch comprising:
 a first module having a first bus segment supporting Ethernet-based communication and at least one first interface for transmitting and receiving Ethernet data packets, the at least one first interface electrically connected to the first bus segment,
 a second module having a second bus segment supporting Ethernet-based communication and a plurality of second interfaces, to each of which an external Ethernet-capable device having a 2-wire interface can be connected via a 2-wire line for transmitting Ethernet data packets, wherein the second interfaces are electrically connected to the second bus segment, wherein the first module and the second module each are arranged in a separate housing and each comprises an interface for electrically coupling the first and second bus segments, and wherein the first bus segment and the second bus segment form a bus for the transmission of Ethernet data packets, and an internal control unit configured to control the transmission of Ethernet data packets via the bus segments to or from the interfaces, wherein Ethernet data packets can be transmitted from one of the plurality of second interfaces via the second bus segment and the first bus segment to the first interface.

2. The modular switch according to claim 1, wherein: the first module comprises at least one optical interface for connecting an optical waveguide, the optical interface connected to the first bus segment via an electro-optical converter, and/or the at least one first interface for connecting a two-wire, or four-wire or eight-wire cable.

3. The modular switch according to claim 1, further comprising: a third module, which comprises a plurality of third interfaces and a third bus segment supporting Ethernet-based communication, the third interfaces each configured as IO-Link interfaces for connecting an external IO-Link device and each connected via a gateway to the third bus segment, wherein the third module is arranged in a separate housing and comprises at least one interface for electrically coupling the third bus segment to the first or second bus segment.

4. The modular switch according to claim 1, further comprising: a fourth module comprising a plurality of fourth interfaces and a fourth bus segment supporting Ethernet-based communication, wherein the fourth interfaces are each configured as wireless interfaces for connecting an external wireless device and are each connected via a gateway to the fourth bus segment, the fourth module arranged in a separate housing and comprising at least one interface for electrically coupling the fourth bus segment to one of the bus segments.

5. The modular switch according to claim 1, wherein: the housings of the modules can be lined up next to each other in a side-by-side arrangement.

6. The modular switch according to claim 1, wherein: the housings of the modules can be latched onto a mounting rail.

7. The modular switch according to claim 1, wherein: the internal control unit is implemented in the first module.

8. A data transmission and control system comprising:
at least one modular switch according to claim 1,
a control device connected to one of the first interfaces of the first module via a two-, or four-, or eight-wire cable, and
at least one Ethernet-capable device having a 2-wire interface, which is connected to one of the second interfaces of the second module via a 2-wire cable for transmitting Ethernet data packets.

9. The data transmission and control system according to claim 8, wherein:
the Ethernet-capable device is an Ethernet-capable I/O device.

* * * * *